United States Patent Office 3,228,812
Patented Jan. 11, 1966

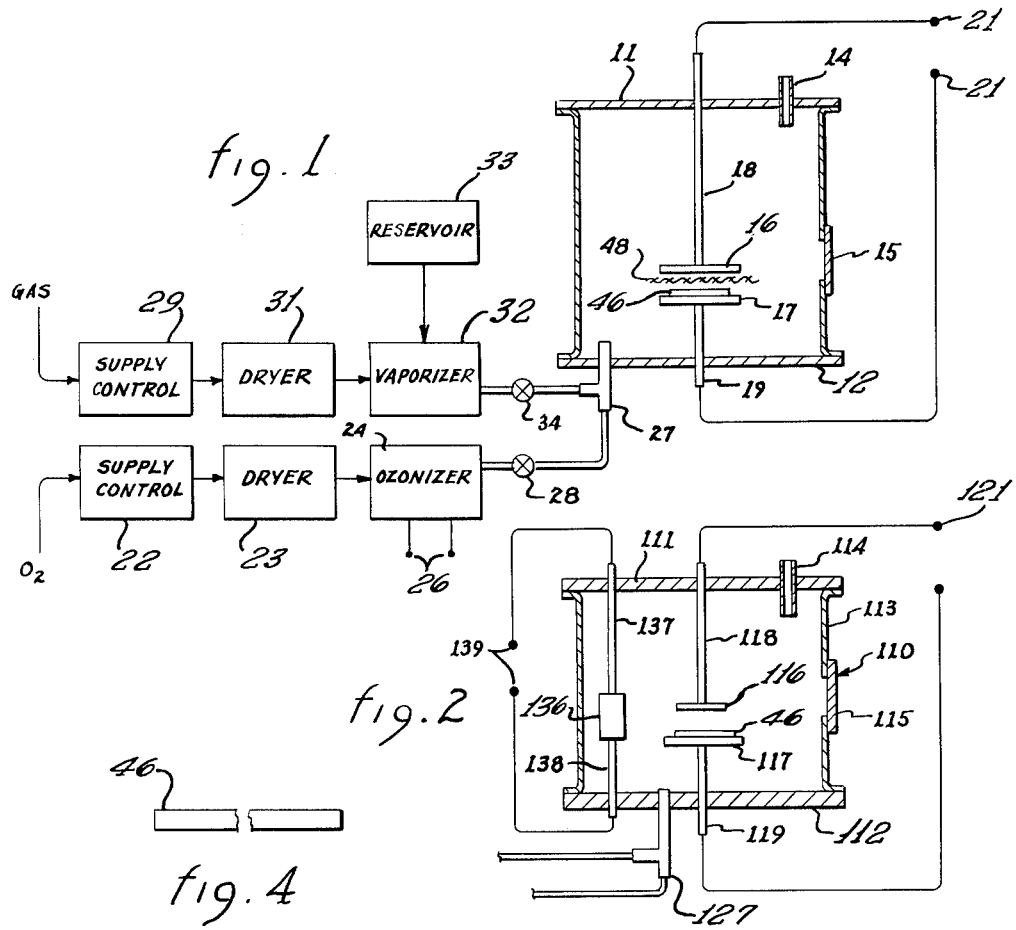
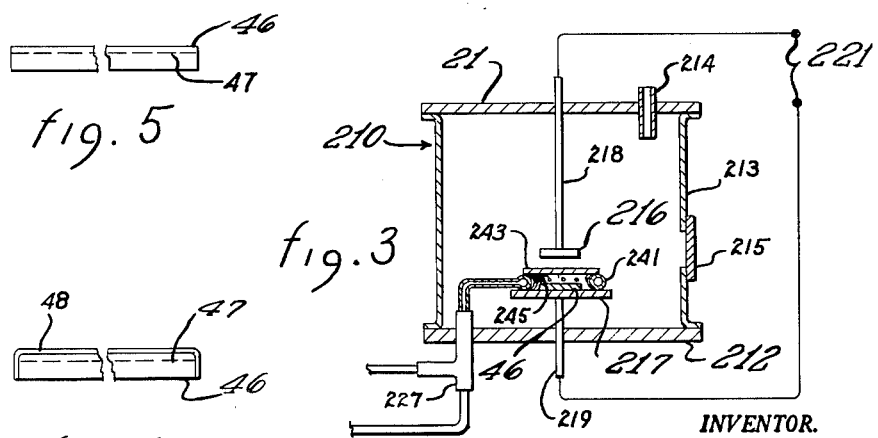

3,228,812
METHOD OF FORMING SEMICONDUCTORS
Frederick L. Blake, deceased, late of Scottsdale, Ariz., by Betty Ann Dickson, administratrix, Phoenix, Ariz., assignor to Dickson Electronics Corporation, Scottsdale, Ariz., a corporation of Delaware
Filed Dec. 4, 1962, Ser. No. 242,856
8 Claims. (Cl. 148—187)

The present invention relates to the production of a glass like, anhydrous, amorphous film to surfaces, such as those on semiconductor elements.

In prior co-pending application, Serial No. 198,825, filed May 31, 1962, the production of a glass like film of silica or the like was disclosed, in which a halide of the glass forming element or elements was reacted at a surface with water vapor to produce a reaction in which oxygen was substituted for the halogen atom, and an oxide film of the glass forming element was formed on the surface. While the process there described offers many advantages over those of the prior art for many purposes, its usefulness is limited because the film may not be completely anhydrous, and because it may moreover be somewhat permeable to water.

Accordingly, a principal object of the present invention is to produce an improved process for producing films of the general type and for the same general purposes as those described in the identified co-pending application.

Another object is the provision of an improved glass like film.

Still another object is the production of a film particularly suitable for a specific purpose, such as, for example, as for diffusion masking, passivation, capacitor dielectric, etc.

In accordance with the present invention, a halide of a glass forming metal, such for example as silicon tetrachloride is introduced into contact with a surface in the presence of ozone, and the halide caused to react with the ozone by an input of electrically generated energy such as an electrostatic discharge, application of a high intensity electrical field suitably with strong local variations in field strength in the reaction zone, the application of strong ultraviolet light, and combinations thereof. Since there is no hydrogen present, water cannot be formed, and the film is anhydrous. The film can be applied to a semi-conductor surface, thus passivating it.

The process may be varied and controlled in many ways, and many different types of equipment may be employed in its production. In the drawings, illustrative apparatus and procedures are shown, wherein:

FIG. 1 is a schematic view illustrating one manner of practicing the process;

FIG. 2 is a schematic view similar to FIG. 1 but embodying some modifications;

FIG. 3 is a schematic view showing a still further modification;

FIG. 4 illustrates an enlarged semi-conductor monocrystalline wafer at one production stage of a semi-conductor element;

FIG. 5 shows the same wafer treated to form a junction, and

FIG. 6 shows the same wafer covered with a glass like film.

Before describing the process in detail by reference to the drawings, it will be helpful to explain further some of the physical chemical mechanisms involved and the more general aspects of reaction and control.

The reacting materials, such as silicon tetrachloride and ozone are preferably introduced into the reaction zone in dilute vapor phase. Since the ozone is formed by partial conversion of $O_2$ into $O_3$, the resulting mixture of $O_2$ and $O_3$ may be introduced directly to the reaction zone, and the ozone content is thus diluted. The silicon metal halide may be diluted, as in the prior application by merely passing argon or other rare or neutral gas into contact therewith, such as bubbling argon gas through a liquid siliconchloride. The argon and siliconchloride may be caused to react by maintaining a uniform short corona discharge at the surface where the reaction is desired, by illuminating the surface with strong ultraviolet light, by applying a strong electrostatic field and causing strong local variations to develop, and by combinations of such techniques.

The chemical reaction which occurs—still assuming the same reactants is:

$$SiCl_4(g) + 2O_3(g) \rightarrow SiO_2(s) + 2Cl(g) + 2O_2(g)$$

The calculated free energy change is −34.0 kcal./mole. Thermodynamically, the reaction is capable of being quantitative, and in actual practice may be controlled to be substantially quantitative. If ozone and silicon tetrachloride, diluted with oxygen and argon respectively, are merely brought together in vapor phase, no reaction occurs. This fact may be likened to that in the case of a hydrogen–oxygen mixture which does not react unless the activation energy barrier is exceeded by an igniting spark. In the reaction of $SiCl_4$ and $O_3$, the activation energy barrier is apparently related to the formation of an oxygen radical. Thus $$O_3 \xrightarrow{energy} -O- + O_2$$

Reaction with silicon tetrachloride then occurs according to the equation $$SiCl_4 + -O- \rightarrow SiOCl_2 + Cl_2$$

and $$SiOCl_2 + -O- \rightarrow SiO_2 + Cl_2$$

The energy required to form the oxygen radical —O— is supplied by controlled electrical discharge and/or by the application of ultraviolet light as already pointed out.

There are many features and advantages of the invention, including the fact that the glass forming process may be carried on at room temperature, or at a wide range of other temperatures and pressures with resulting features and advantages in each case. Since high energy may be provided at the reaction surface, the process may be rapid. Good process control may be effected in several ways, such as by controlling the composition of the reacting vapors or the energy input at the reaction zone. At relatively low pressures, such as atmospheric, the mean free path of the reacting vapor is small, and the film can be deposited uniformly on surfaces of intricate configuration. By-products are normally gases, such as chlorine and oxygen when the reaction is between silicon tetrachloride and ozone. Such gases have no particular affinity for the deposited film and are easily removed from the system by simple scavenging mechanism.

The process has wide flexability. Because of the high energizes involved, the rates of ozonolysis are comparable for a wide variety of metal halides, including the halides of such metals as boron, aluminum, germanium, tin, lead, phosphorus, arsenic and others, including all of the metals which may be characterized as "glass-forming," either alone or in combination. With suitable controls, all of the halides may be used, but preference is given to chlorides and/or halogens which may be introduced to the reaction zone in vapor form. It should be remembered that the halogen is merely a radical participating in the reaction which normally completely disappears as the film is formed.

Referring now to FIG. 1, a reaction chamber 10 has top and bottom 11 and 12 respectively, which may be Teflon or the like material, and a generally circular side wall 13, preferably transparent for inspection, and optionally formed of a suitable clear plastic. The chamber 10 is sealed except for a bleeder pipe 14. Any suitable type of door 15 is provided to furnish access to the chamber. Electrodes 16 and 17, the latter also functioning as a support for a wafer or the like to be glass-encased, are carried on suitable supports 18 and 19 sealed through the chamber walls. Both the electrodes and their supports comprise suitable conductive material, and the supports are adapted to be connected to a suitable source of electrical power through contacts 21.

As one means for introducing reacting materials for glass formation, there is shown a control 22 for oxygen received from a suitable source such as a commercial type of gas under high pressure (not shown). The member 22 in such case could be an ordinary commercial flow meter. The oxygen then passes through a dryer 23 which may be merely a sealed vessel filled with a desiccant. The dry oxygen is then passed through a commercial ozonizer 24 supplied with electric power through contacts 26. The ozone-laden oxygen is then passed into a premixing device 27 through a control valve 28. The premixing device, shown as a simple T, delivers the ozone to the reaction chamber.

The equipment also includes a control 29 for a reactant (or carrier for the reactant); a dryer 31, a vaporizer 32 and a supply reservoir 33. If an inert gas is employed to entrain a liquid metal halide, as illustrated in the above co-pending application, the said gas would be introduced through a flow meter 29, then through a desiccant 31 and bubbled through a level of liquid, as in 32. In such case, the reservoir would be employed to maintain a uniform level of liquid in the vaporizer. The inert gas with its burden of metal chloride vapor is then delivered to the pre-mixing device 27 through a volume control valve 34. With suitable complete control at 22 and 29, valves 28 and 34 can be deleted.

The apparatus shown in FIG. 2 may be identical with that shown in FIG. 1, but there is included an ultraviolet lamp 136 carried on conducting supports 137 and 138, and adapted to be connected to a source of electric power through contacts 139. The remaining portions of FIG. 2 bear the same reference characters as FIG. 1 with the prefix 1 to indicate modification.

In FIG. 3, the arrangement of parts is in general like FIG. 1; and the corresponding parts are given the same reference characters, with, however, the prefix 2 to indicate modification. In addition to FIG. 1, however, FIG. 3 employs a spreader ring 241 which may be supported on or near the electrode 217. The spreader ring 241 is connected to the pre-mixing device 227 by an integral down spout 242. The spreader ring is preferably formed of dielectric material such as nylon, or other suitable plastic, a refractory such as alumina or the like material which will not deleteriously affect the normal operating of the electrodes 216 and 217. The spreader ring 241 is provided with a plurality of small holes 243 for delivering the reactants directly into contact with the surface to be coated.

As one example of the process, a silicon wafer comprising a monocrystal of doped silicon was treated to form a p-n junction indicated at 47 in FIG. 5. It was then placed on electrode 17 in apparatus as shown in FIG. 1 and covered with a perforated dielectric in the form of nylon cloth 48 of slightly larger diameter than the silicon wafer. The reaction chamber was then closed and oxygen and argon passed slowly through the chamber for fifteen to thirty minutes to purge the reaction chamber of all air and moisture. The rate of argon flow was then adjusted to two cubic feet per hour (c.f.h.), and the argon bubbled through $SiCl_4$ in the vaporizer at a rate of about ten pulses per minute to substantially saturate the argon with $SiCl_4$ vapor, the temperature in the vaporizer being near ordinary room temperature. (Compare FIG. 1 of Serial No. 198,825 which also delivers vapor saturated argon at about room temperature or slightly below.) At the same time, the oxygen is set to be delivered at the rate of one c.f.h.

After allowing an additional several minutes to further purge the reaction chamber and fill it with vapor delivered at the rates of 2.0 c.f.h. of vapor laden argon and 1.0 of $O_2$, the ozonizer and discharge electrodes were energized. A voltage of 10–15 kv. A.C. was applied to the ozonizer and 30 kv. D.C. to the electrodes. This condition was allowed to continue for two hours during which time a corona like discharge was observed near the exposed top surface of the wafer 46. A glass like film 48 (FIG. 6) was found to have been deposited on the exposed surfaces of the wafer 46. The thickness of the film was somewhat irregular, reflecting a slight grid-like appearance, resulting most certainly from the grid structure of the fibers of the nylon cloth.

The above illustration of the process may be modified in many ways. It was found, for example, that the direct current voltage impressed across the electrodes 16 and 17 can be varied rather extensively, very good results being obtained as a rule between 20 kv. D.C. and 30 kv. D.C. Depending on the desired thickness of the film 48, processing can be carried out for from one to four or more hours. After a period of about four hours, for example, the film thickness was found to be between .001 and .0002 inch, depending on the nature of the dielectric used and the adjustment of the electrode—wafer—dielectric system. When a uniform corona like discharge is obtained in the immediate vicinity of the wafer surface the maximum rate of film growth is attained, as well as the most uniform thickness.

When nylon cloth (or other porous dielectric) is used, it may be placed directly over the wafer, or it may be placed in a small frame for support over the wafer. Nylon fibers have a dielectric constant of about 3.5, and of course the air spaces in between the fibers will have a dielectric strength of about 1. In a high intensity electric field, it appears that there will be strong local variations in field strength along the plane of the dielectric because of the closeness of the fibers. These field strength variations appear to directly contribute to the corona like discharge which is observed. Various dielectric material, such as several types of paper, such as paper formed of glass fibers may be used. Films of substantially uniform thickness may thus be obtained.

By suitable use of ultraviolet light, formation of a glass like film may be carried out in a controlled manner. In a specific example, vaporous silicon tetrabromide was introduced dispersed in argon, along with an oxygen-ozone mixture in the general manner described. The apparatus was set up as in FIG. 2, and light at 2000 A. of approximately 100 watts intensity was used. Ozonolysis occurred preferentially at the interface between the surface of the wafer 46 and the gas ambient. The explanation appears to be that the density of the surface adsorbed metal halide is many orders of magnitude greater than that of the vapor phase molecules. In this example silicon tetrabromide appears to be more active as a film former than silicon tetrachloride, and this is probably explainable by the fact that the bromide molecule has a lower vapor pressure than the corresponding chloride molecule.

In another example, a mixture of three parts of silicon tetrabromide and one part of tin tetrachloride were vaporized in helium and introduced into the reaction chamber as in the above example, and light at 2500 A. employed to promote film formation. A continuous, amorphous and very hard film was formed.

A germanium wafer similar to the silicon wafer 46 was placed on the electrode 217 (FIG. 3) and a mixture of germanium tetrachloride vapor and boron tetrachloride vapor dispersed in argon, together with a mixture of oxygen and ozone introduced into the ring 241 beneath a dielectric screen 245. Direct current at 30 kv. was then applied to the electrodes for one and one half hours.

A corona discharge near the wafer surface was observed. The delivery of the reactants directly to the surface increases the reaction rate somewhat, and improves the uniformity of the film, possibly by a mechanism in which introduced gases purged the area of such reaction products as $Cl_2$ and excess oxygen. The resulting product with a film on one flat surface was then heated in a known manner to diffuse boron into such surface.

In prior application Serial No. 198,825, various examples are given for producing various types of films on various semi-conductor elements, such for example, as in producing multiple dies from a single wafer as in FIG. 2 of such application, or in producing a planar diode, as in FIG. 4, or a transistor as shown in FIG. 5. All of these methods and procedures are available with the present invention, except that for the most part, glass like films produced by the present invention offer advantages from a moisture inclusion and moisture absorption standpoint.

While there are instances in which a metal halide cannot be converted to an oxide by hydrolysis, we have found no instance in which an oxide cannot be formed by reaction of ozone with any metal halide in response to an energy induced decomposition of the ozone. There is no theoretical evidence indicating any limitations in this reaction. It is clear, therefore, that ozonolytic oxide formation provides a mechanism for vapor depositing amorphous oxides of a very great variety of compositions. While vapor pressures of various metal halides vary considerably, and thus may present some specific problems, in general bringing such vapors into contact with a surface to be glass enclosed in proper proportions to produce the desired reaction is merely a matter of technique.

Glass-like films of various characteristics may thus be produced, and the properties controlled for most effective passivation, diffusion masking, capacitor dielectrics, etc.

As an example, a mixture of silicon tetrachloride and boron tetrachloride is vaporized in an inert gas and introduced into the reaction chamber with a mixture of oxygen and ozone. A plurality of complete silicon dies, each with a p-n junction, are placed on the bottom electrode, and a zone immediately above them controlled to introduce a variable dielectric between the top and bottom electrodes. A direct current high electrostatic charge is applied to the electrodes to form a borosilicate film by ozonolysis of the silicon tetrachloride-boron tetrachloride mixture. The glass film of borosilicate so formed on exposed die surfaces has low moisture permeability, and a thermal expansion co-efficient and dielectric constant matching those of silicon. A passivating film may be applied to semi-conductor elements by the same procedure using, for example, a mixture of lead tetrachloride, and boron tetrachloride to produce a lead-borosilicate passivating film. For capacitors, a high dielectric constant film such as titanium-silicate is effective, and such a film may be readily produced by means of the present process.

Because of the high energies achieved in the present process with the electrostatic charge, the corona effect and/or strong ultraviolet light, it is also possible to deposit films of metal nitrides, carbides, borides, phosphides, etc. Such films may be formed by depositing such films from a vapor phase by reacting a metal halide with nitrogen, carbon dioxide, borane, phosphine, etc. By such means refractory films, dielectrics, and dense encapsulating films may be deposited on semi-conductor and the like surfaces.

In carrying out the present invention, substantially any metal halide may be employed, and the metal selected will be determined in part at least by the specific film characteristics desired. For application to surfaces of semi-conductors, Group III, IV, and V metals as a rule are employed. Any metal halide may be made to react by ozonolysis, but the selection will be made on the basis of relative vapor pressures as well as corrosion characteristics in a given environment.

We claim:

1. The method of producing a glass like film on a prepared surface of a semi-conductor, which comprises introducing a dilute vapor of a metal halide to such surface and introducing ozone to such surface to cause a reaction between said metal halide vapor and said ozone, to form a solid oxide film of such metal on said surface and produce free halogen molecules and free oxygen molecules and supplying free energy to the reaction zone to accelerate the said reaction.

2. The method of treating a semi-conductor element which comprises
   (a) contacting a surface thereof with a vaporous halide of a metal of the class consisting of Group III, IV and V metals, and
   (b) reacting said vaporous metal halide with ozone in the presence of a free energy field to form a continuous glass like film of metal oxide on said semi-conductor surface.

3. The method of treating a surface of a semi-conductor element which comprises
   (a) contacting said surface with an inert gas in which is suspended a relatively small proportion of at least one metal halide of a glass-forming element taken from Group III, IV and V of the periodic table,
   (b) simultaneously contacting said surface with oxygen with which said halide is mixed,
   (c) and applying an electrical energy field to the said surface to convert part of said oxygen to ozone,
   (d) to thereby react said metal halide and ozone to form a continuous film of glass like metal oxide material on said surface.

4. The method of treating a surface of a semi-conductor element which comprises
   (a) maintaining said element in an inert atmosphere in which is disposed
      (1) a vaporous halide of a glass-forming element,
      (2) a proportion of ozone
   (b) applying free energy to a reaction zone at said surface,
      (3) until said halide and ozone react to form a relatively thin, continuous film of glass like material on said surface.

5. The method of treating a surface of a semi-conductor element which comprises
   (a) placing said element on a support in a closed reaction chamber,
   (b) passing an inert gas continuously into said chamber,
   (c) suspending in a portion of said gas a metal halide of a glass forming metal,
   (d) introducing a relatively small proportion of ozone into said reaction chamber,
   (e) applying high intensity ultraviolet light to said surface,
   (f) to thereby react said halide with said ozone in said chamber and at said surface to form a uniform glass-like metal oxide film thereon, and
   (g) continuing said reaction until said glass like film has reached a desired thickness.

6. The method of treating a surface of a semi-conductor element which comprises
   (a) placing said element on a support in a closed reaction chamber,
   (b) passing an inert gas continuously into said chamber,
   (c) suspending in a portion of said gas a metal halide of a glass forming metal,
   (d) introducing a relatively small proportion of ozone into said reaction chamber,
   (e) subjecting said surfaces to a high electrostatic charge in the presence of a zone of variable dielectric strength,
(f) to thereby react said halide with said ozone in said chamber and at said surface to form a uniform glass-like metal oxide film thereon, and
(g) continuing said reaction until said glass like film has reached a desired thickness.

7. The method of treating a diode with a peripheral surface having an exposed junction edge which comprises
(a) contacting said peripheral surface with dispersed molecules of a halide of a glass-forming metal, and
(b) reacting said metal halide molecules with ozone in the presence of an intense electrostatic field to form a glass like film of a metal oxide adherent to said peripheral surface and covering said exposed junction edge.

8. The method of forming a planar diode which comprises
(a) applying a masking material to a relatively small surface of a wafer comprising a doped monocrystal,
(b) contacting surfaces of said wafer with dispersed molecules of a halide of a glass-forming metal,
(c) reacting said metal halide molecules with ozone in the presence of an intense electrostatic field to form a glass-like metal oxide film adherent to said exterior surface including said masked portion,
(d) removing said masking material and adherent film to form a small opening in said film through which the wafer is exposed, and
(e) diffusing a doping material into the wafer at said opening to form a p-n junction, the edges of which are under the said glass-like film.

References Cited by the Examiner

UNITED STATES PATENTS

| | | | |
|---|---|---|---|
| 745,966 | 12/1903 | Machalske | 204—164 |
| 2,952,598 | 9/1960 | Suchet | 204—164 |
| 2,962,388 | 11/1960 | Ruppert | 117—106 |
| 3,055,776 | 9/1962 | Stevenson | 117—212 |
| 3,089,793 | 5/1963 | Jordan et al. | 148—187 |
| 3,090,703 | 5/1963 | Gruber | 117—106 |

FOREIGN PATENTS 765,190   1/1957   Great Britain.

OTHER REFERENCES

Mellor, Comprehensive Treatise on Inorganic and Theoretical Chemistry, volume 6, 1925, Longmans, Green & Co., N.Y., pages 968–975.

Pauling, General Chemistry, 2nd edition, 1954, W. H. Freeman & Co., page 119.

HYLAND BIZOT, *Primary Examiner.*

BENJAMIN HENKIN, DAVID L. RECK, *Examiners.*

H. W. CUMMINGS, *Assistant Examiner.*